United States Patent [19]

Long

[11] Patent Number: 4,501,598
[45] Date of Patent: Feb. 26, 1985

[54] GAS BORNE PARTICLE FILTERING METHOD

[75] Inventor: James Long, Bloomfield Hills, Mich.

[73] Assignee: James M. Hammond, East Lansing, Mich. ; a part interest

[21] Appl. No.: 440,171

[22] Filed: Nov. 8, 1982

Related U.S. Application Data

[63] Continuation-in-part of Ser. No. 319,264, Nov. 9, 1981, Pat. No. 4,378,980.

[51] Int. Cl.³ .............................................. B03C 3/64
[52] U.S. Cl. .......................................... 55/2; 55/103; 55/131
[58] Field of Search ................. 55/2, 97, 103, 131, 55/155, 132

[56] References Cited

U.S. PATENT DOCUMENTS

| | | | |
|---|---|---|---|
| 2,804,937 | 9/1957 | Poole | 55/103 |
| 2,908,347 | 10/1959 | Roos | 55/131 X |
| 2,945,557 | 7/1960 | Powers | 55/103 X |
| 3,237,387 | 3/1966 | Haugen et al. | 55/103 X |
| 3,290,868 | 12/1966 | Upor | 55/103 X |
| 3,307,332 | 3/1967 | Grace et al. | 55/155 X |
| 3,658,099 | 4/1972 | Daringer | 55/526 X |
| 3,680,287 | 8/1972 | Wood et al. | 55/103 X |
| 3,745,748 | 7/1973 | Goldfield et al. | 55/97 |
| 3,961,924 | 6/1976 | Alskog | 55/131 X |
| 4,011,067 | 3/1977 | Carey, Jr. | 55/103 X |
| 4,229,187 | 10/1980 | Stockford et al. | 55/103 X |

FOREIGN PATENT DOCUMENTS

| | | | |
|---|---|---|---|
| 639599 | 5/1962 | Italy | 55/131 |
| 794038 | 4/1958 | United Kingdom | 55/131 |

OTHER PUBLICATIONS

"Media and Fabricated Products For Solids-Liquid Separation", Bulletin No. 618R, Multi-Metal Wire Cloth Inc., Tappan, N.Y., 1966.

Primary Examiner—Kathleen J. Prunner
Attorney, Agent, or Firm—Ian C. McLeod

[57] ABSTRACT

A method for filtering gas borne particles using a filter medium (13) in contact with a screen (14) composed of polymeric strands (30, 31) is described. The method is characterized by the fact that the filter medium flutters on the surface of the screen because of flow of the gas along the surface of the filter medium to generate an electrostatic charge in the medium which attracts the particles to the filter medium. Particles 0.1 micron and larger in the gas can be removed by the method.

12 Claims, 11 Drawing Figures

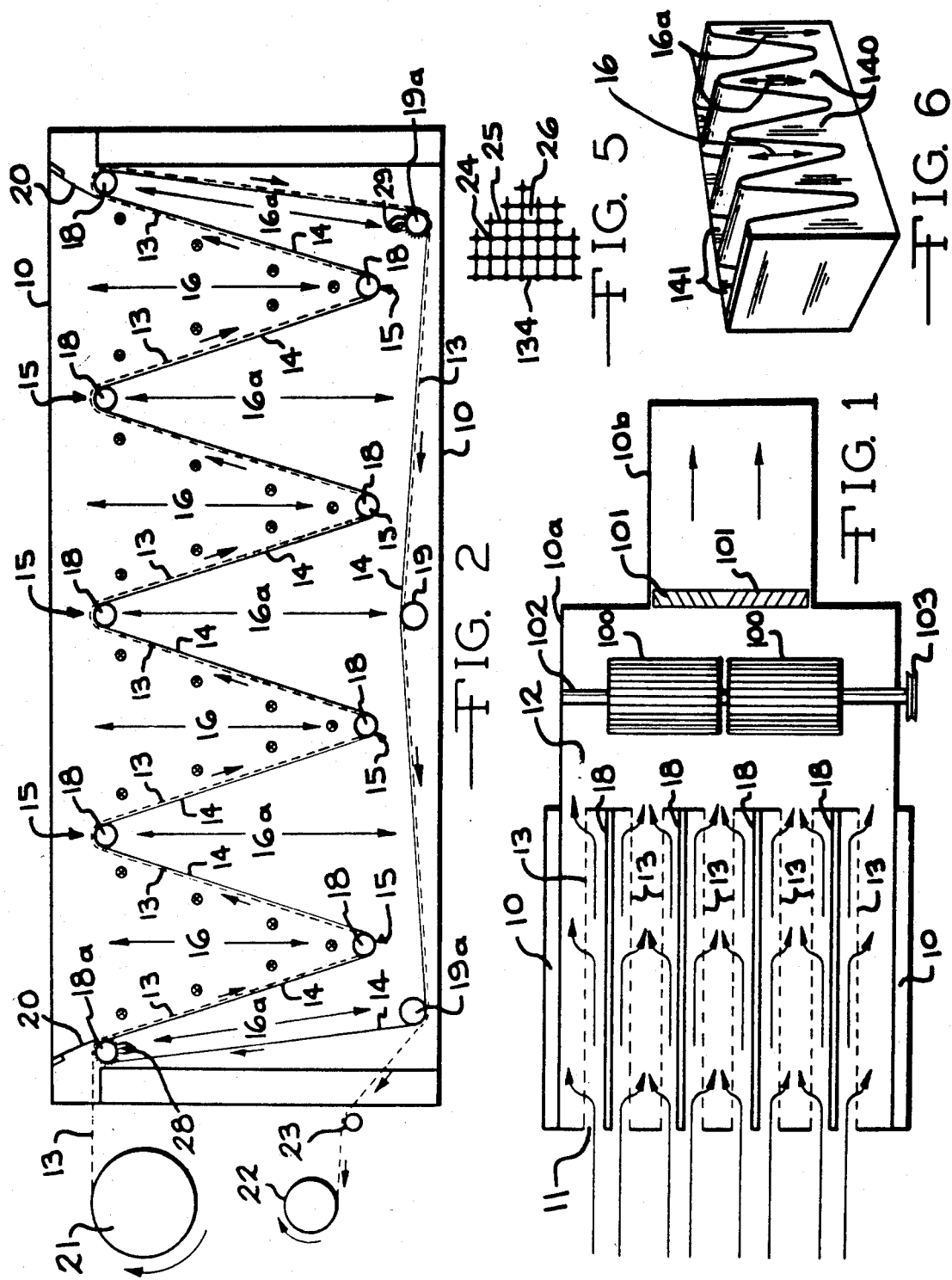

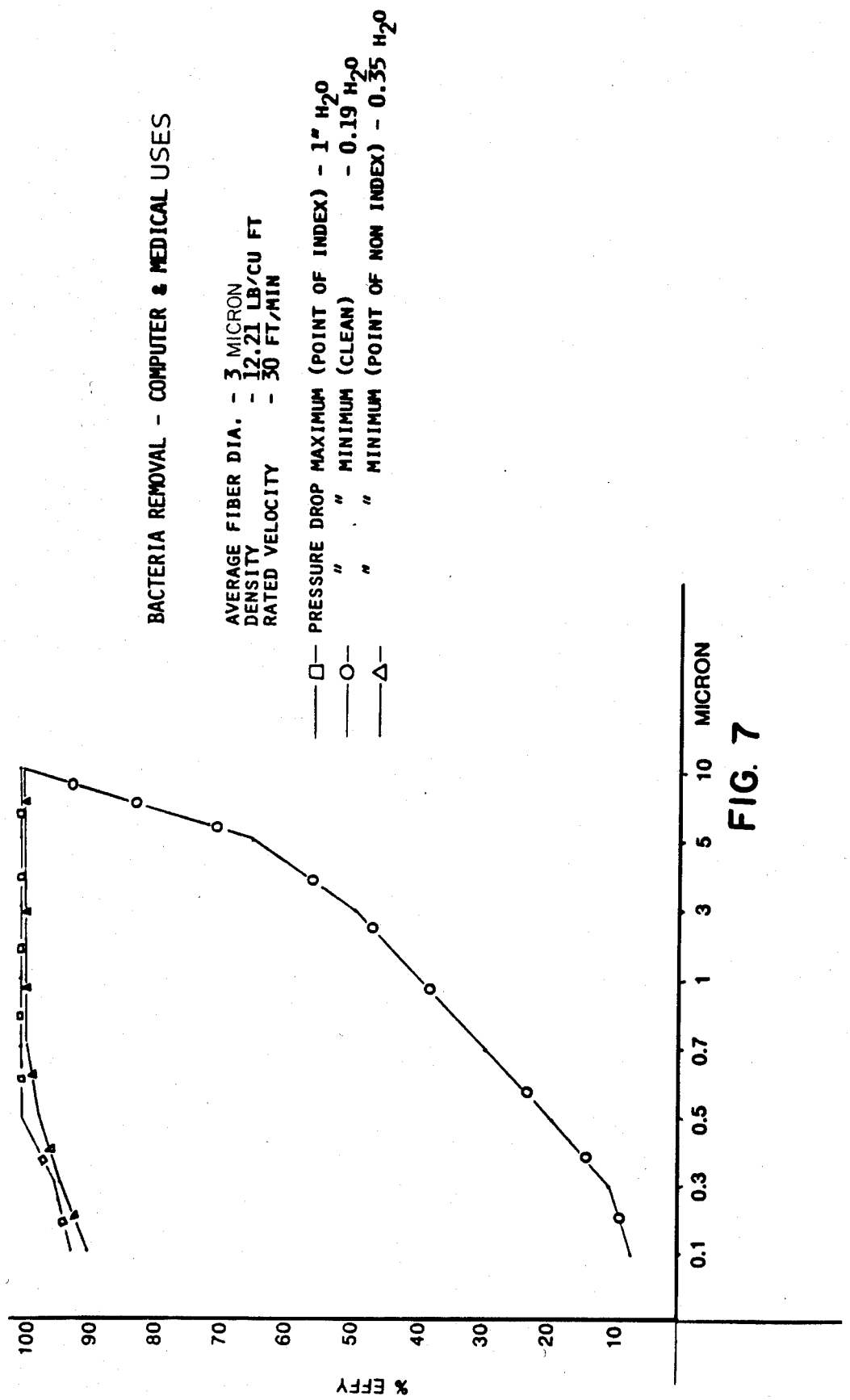

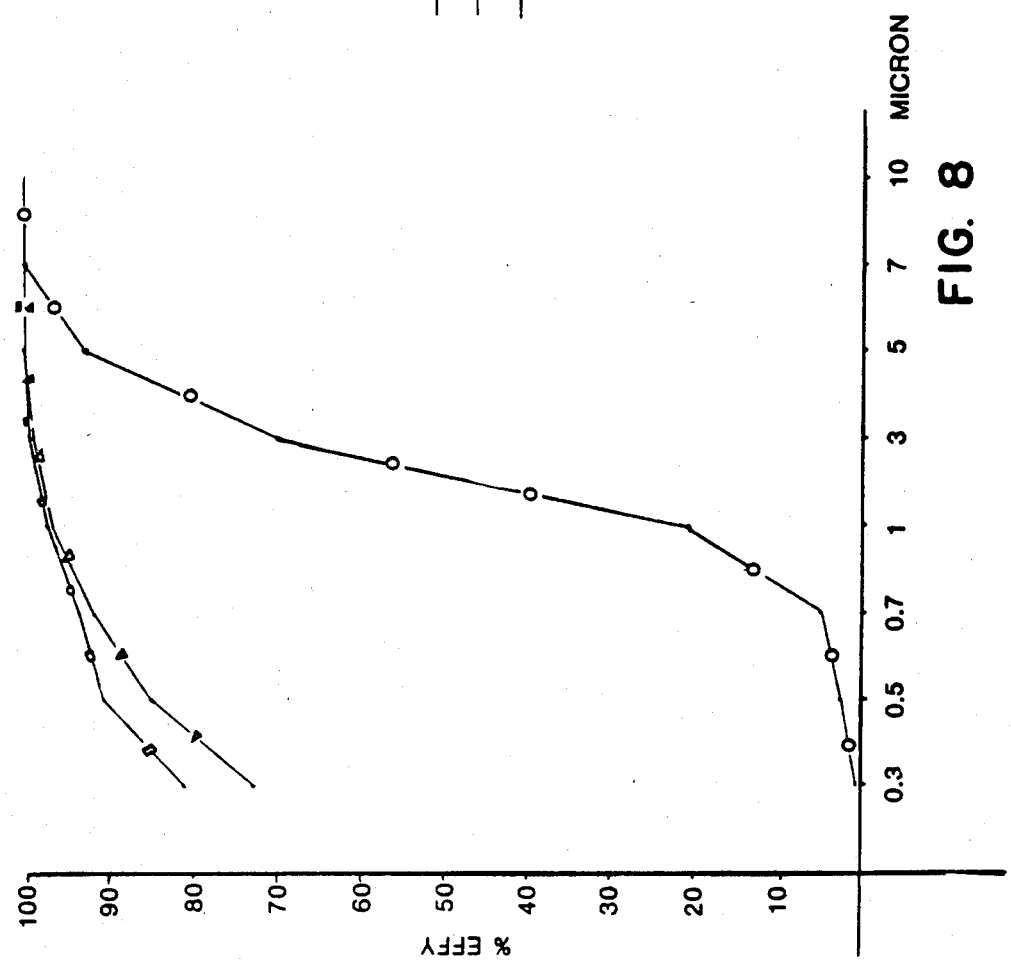

GAS BORNE PARTICLE FILTERING METHOD

CROSS-REFERENCE TO RELATED APPLICATION

This application is a continuation-in-part of application Ser. No. 319,264, filed Nov. 9, 1981, now U.S. Pat. No. 4,378,980.

BACKGROUND OF THE INVENTION

1. Field of the Invention

The present invention relates to an improved gas filtering apparatus and method. In particular the present invention relates to an apparatus and method adapted for cleaning air of small, micron sized particles.

2. Prior Art

The prior art is concerned with conservation of energy used to heat a gas, particularly air, used in a confined work space where small particles are generated. Under manufacturing conditions, air can accumulate very fine micron sized particles which are a health hazard and which can create a fire hazard. In many plants, in the winter, the particle laden, heated air is vented to the atmosphere and fresh air is heated from outside ambient temperatures for use in the building. In the summer, the reverse is true and cooled air is vented. This process is a waste of energy, since the particle laden gas or air can be cleansed and recycled.

U.S. Pat. No. 1,965,717 to Wechsberg describes a dust filter device as does Canadian Pat. No. 1,072,890 to Muermans. In these devices the filter medium is unsupported and the filters are concerned with dust sized particles (50 microns and above). The air flow is parallel to the surface of the filter medium.

The prior art is faced with the problem of providing appropriate filter medium and filtering apparatus which allows for filtering of micron sized particles particularly for welding smoke and oil mist. The problem is to remove micron sized particles such as smoke or oil mist. Generally the prior art has used apparatus wherein gas flow towards the filter medium is perpendicular to the general plane of the medium, tending to drive the particles through the medium. Because of the density of the filter medium a porous support must be used for support of and transfer of the filter medium.

The prior art shows various types of filter media having a sawtoothed configuration. In all of this prior art where a porous support is used the gas flow is directed towards the projections defining the sawtoothed configuration with the gas flow perpendicular to the general plane defined by the filter medium. I have found that the particles in the gas tend to be driven directly through the filter medium even with this configuration. Also this gas flow creates turbulence at the filter medium surface and tends to dislodge particles embedded in the medium.

U.S. Pat. No. 2,016,991 to Dollinger, shows the use of moveable screen belts 7a supporting a filter medium in a sinuous path where the gas flow p is directed towards the projections and the general plane of the filter medium. The filter medium is slightly wider than the width of the casing 4 which forms a seal with the walls of the casing.

U.S. Pat. No. 1,982,639 to Christofferson shows a device wherein non-moveable screens 31 position the filter media B during filtration. Automatic feed means is provided for advancement of the filter media. The gas flow is directed towards the projections and the general plane of filter medium.

U.S. Pat. No. 2,076,305 to Strindberg shows a similar type of device to that described by Dollinger without the moveable screen.

U.S. Pat. No. 2,133,931 to Walker et al describes a mechanism for forming a sinuous filter medium whereby wedge shaped clamping rails 28 and 29 on slide plates 14 are moveable to engage the filter media A during filtration. The gas flow is the same as Dollinger.

U.S. Pat. No. 3,019,855 to Engle describes specific means for securing the edges of the filter media 45 and also a means for detecting the difference in pressure in the filter media in order to provide for advancement for the fresh media. The gas flow is the same as the earlier patents.

U.S. Pat. No. 3,045,410 to Floyd shows a roll type device wherein the rolls 12 are in contact with the filter media 19. The gas flow is conventional.

U.S. Pat. No. 3,406,503 also to Floyd shows a mechanism for the edge support of the filter media. The gas flow is conventional.

U.S. Pat. No. 3,438,588 to Steinholtz et al shows a device wherein the filter media 1 is continuously fed from a roller 2 in a zigzag, sawtoothed or sinuous path. The gas flow is conventional.

U.S. Pat. No. 3,552,099 to Floyd shows a sawtoothed type filter web with a specific form of sealing means for the filter media 30. The gas flow is conventional.

One of the earliest patents is Birkholz, U.S. Pat. No. 1,783,181, wherein a rotary drum supports a moveable filter media. This patent describes the use of automatic means to advance the filter media after it encounters objectionable resistance because of the accumulation of particles. U.S. Pat. No. 3,596,442 to Neumann and U.S. Pat. No. 3,745,748 to Goldfield show improvements on this basic patent. The gas flow is conventional.

There are numerous other patents showing various devices to be used with gas (air) filters or other filter medium configurations, including U.S. Pat. Nos. 2,113,896; 2,881,859; 2,848,064; 2,853,155; 3,020,976; 3,332,215; 3,337,898; 3,350,853; 3,350,854; 3,464,487; 3,467,797; 3,348,366; 3,774,373; 4,229,187; 3,985,528; 4,011,067 and 4,054,521. In all of the prior art devices the flow of the gas is perpendicular to the general plane of the filter. In some an electrostatic charge is created (U.S. Pat. No. 4,229,187) to facilitate the capture of the particles.

OBJECTS

It is therefore an object of the present invention to provide a gas filtering apparatus and method for micron sized particles having a unique gas flow path which provides improved particle capture by the filter medium. Further it is an object of the present invention to provide an apparatus and method which generates an electrostatic charge in the filter medium which enhances particle capture. Further still it is an object of the present invention to provide an apparatus which is very compact, and relatively simple and inexpensive to construct. These and other objects will become increasingly apparent by reference to the following description and to the drawings.

IN THE DRAWINGS

FIG. 1 is a schematic cross-sectional plan view of the apparatus of the present invention particularly illustrating the gas flow along the surface of a filter medium between the sawtoothed projections defined by a continuous filter belt.

FIG. 2 is a schematic front cross-sectional view of the apparatus shown in FIG. 1 particularly illustrating the positioning of the sawtoothed projections with tails of arrows (shown by a circle around an x) showing the gas flow along the surfaces of sawtoothed projections supporting the filter medium.

FIG. 5 is a partial sectional view of a porous support, such as the screened belt, showing bonding of intersections or nexus between the non-metallic strands forming the screened belt.

FIG. 6 is a schematic isometric view showing the staggered positioning of portions of the outside casing defining the sawtoothed configuration of the projections.

FIGS. 7, 8 and 9 are graphs showing the performance of various polyester fiber filter media on a polyester strand screen, such as shown in FIG. 5, used for the belt in bench testing where "Micron" is the particle size in microns and "Effy" is the separation efficiency.

GENERAL DESCRIPTION

Figure 3:
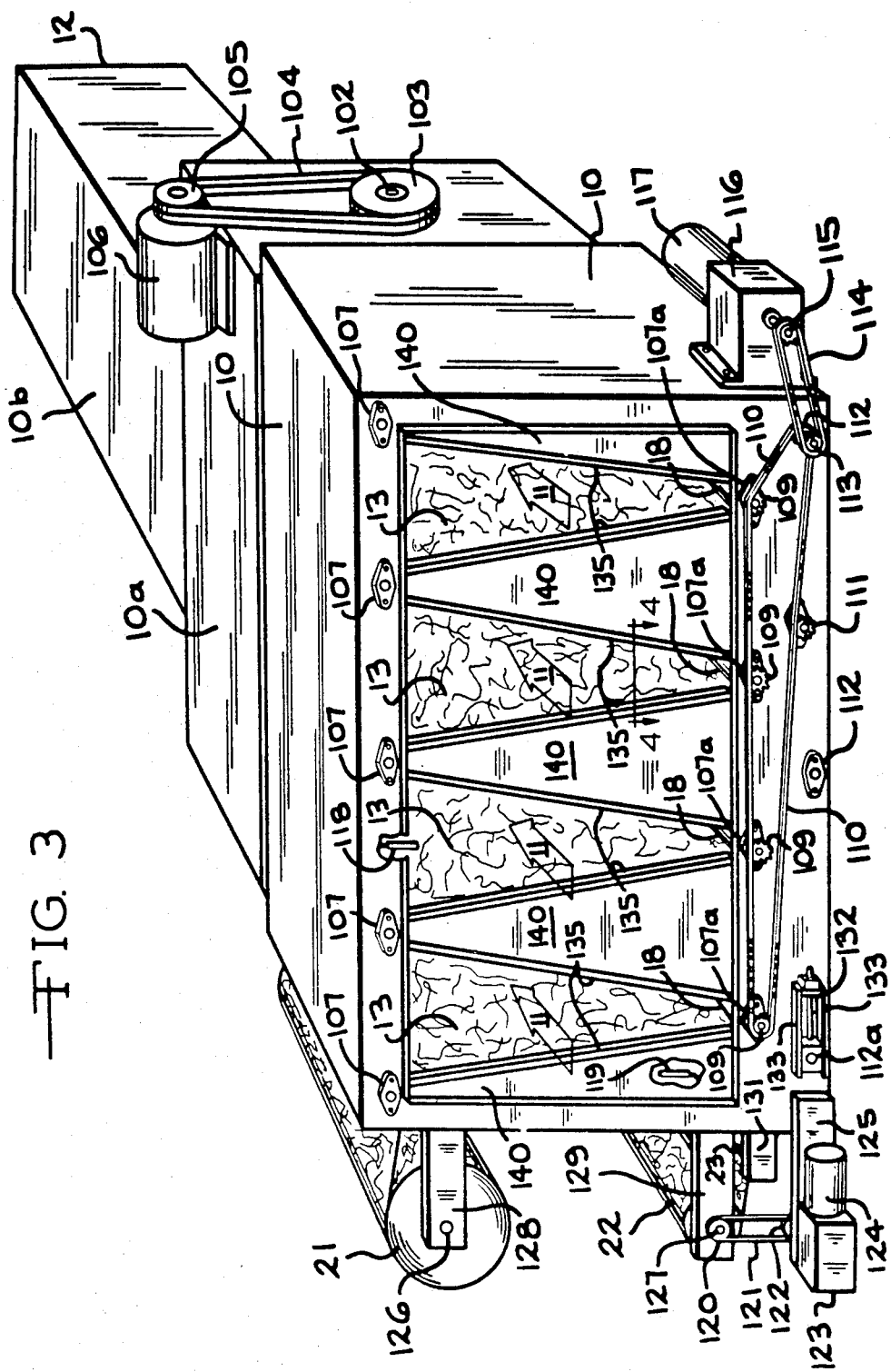
FIG. 3 is a front isometric schematic view of the preferred apparatus of the present invention showing the preferred staggered sawtooth configuration such that the gas passes along and between the projections and through the filter medium and particularly showing small partial cross-sections illustrating the location of sensor devices.

The invention relates to a gas borne particle filtering apparatus including a filter medium (13) having first and second surfaces (13a and 13b) and a depth (d) between the surfaces, an outer casing (10) having an inlet and an outlet opening (11, 12), an endless moveable feed belt (14) in the casing defining rounded tip (15) multiple sawtoothed cross-sectioned projections alternately pointed in two opposite first and second directions (16 and 16a) which is located between the inlet and outlet openings, rollers (18) mounted on the casing at the tips of the projections and moveably supporting the filter medium and belt with the first surface of the filter medium adjacent the inlet opening and the second surface of the filter medium in contact with the belt, wherein the inlet and the outlet openings are separated by the filter medium in the casing for filtration and including means for moving the feed belt to remove the filter medium and means for collecting the removed filter medium, the improvement which comprises:

(a) closing the projections pointing in the first direction (16a) with a first side of the casing (10) such that the projections pointing in the second direction (16) define the inlet openings (11); and (b) closing the projections pointing in the second direction (16) with a second opposite side of the casing (10) to the first side such that the projections pointing in the first direction (16a) define the outlet openings (12);

wherein in use gas flow with the particles is along the first surface (13a) of the filter medium towards the sawtoothed projections closed pointed in the second direction (16) on the second side of the casing, then at an angle from the gas flow along the first surface through the filter medium, then through the feed belt and then along the second surface (13b) of the filter medium and the belt away from the projections closed in the opposite direction (16a) on the first side of the casing and then out the outlet opening.

The present invention also relates to a method of filtering gas borne particles in a filtering apparatus wherein the inlet and outlet openings (11 and 12) are separated by a filter medium (13) mounted on a porous support (14) for filtration, the improvement which comprises:

providing a small mesh screen as the porous support (14) composed of polymeric strands, the screen having a mesh size of about 6 or greater in contact with a filter medium (13) wherein upon interaction of the screen in contact with the filter medium during gas flow an electrostatic charge is created which attracts 0.1 micron and larger sized particles to the filter medium for removal from the gas; and flowing a gas through the filter medium and the screen at a gas velocity of between about 25 and 1000 feet per minute (12.5 to 5000 centimeters per second) at a pressure drop across the filter medium of less than about 2 inches of water ($4.9 \times 10^{-3}$ atmospheres), wherein an increasing percentage of the particles of a particular size are removed as a result of particle loading of the filter medium during filtration.

The present invention particularly relates to a continuous belt (14) for use in apparatus for filtering gas borne particles with a filter medium (13) having a first side (13a) for receiving the gas borne particles and a second side (13b) wherein the gas is removed without the particles, the improvement which comprises:

a continuous belt (14) in the form of a small meshed non-metallic screen composed of polymeric strands having nexus (24, 29) which are interbonded or crimped in the form of a continuous belt adapted to be in contact with the second side of the filter medium (13b) such that during gas flow interaction of the screen in contact with the filter medium produces an electrostatic charge which attracts 0.1 micron and larger sized particles.

SPECIFIC DESCRIPTION

Referring to FIGS. 1 to 3, the apparatus of the present invention is shown including an outer casing 10 having an inlet opening 11 and an outlet opening 12. Filter medium 13 is mounted in the casing 10 on an endless moveable feed belt 14 which defines rounded tip 15 sawtoothed projections pointed in direction 16 and 16a between the inlet opening 11 and the outlet opening 12. Rollers 18 and 18a moveably support the belt 14 at the tips 15 of the projections pointed in the directions 16 and 16a in the casing 10. Return rollers 19 and 19a support the return of the belt 14 to the rollers 18. Flexible seals 20 are connected to the casing 10 and are in contact with the filter medium 13 to provide sealing of the filter medium 13 between the inlet opening 11 and the outlet opening 12. Generally the filter medium 13 is fed from a roll 21 and periodically removed when spent by particle loading on a takeup roll 22 tensioned by a guide 23 outside the casing 10. The inlet opening 11 and the outlet opening 12 are separated by the filter medium 13 for filtration of the gas borne particles. The rollers 18a and 19a have radially projecting wire brushes which positively engage and align the belt 14. The return roller 19a provides the drive means for the belt 14. The preceding description generally encompasses a number of prior art devices.

A unique feature of the present invention includes an inlet opening 11 and an outlet opening 12 positioned in the casing 10 adjacent the sawtoothed projections pointed in the directions 16 and 16a such that in use the gas flow (shown by arrows in FIGS. 1 to 3) is along the surfaces of the sawtoothed projections pointed in the directions 16 on a first side 13a of the filter medium then at an angle from the gas flow through the filter medium 13 having a depth d and then through the screened feed belt 14 and along a second surface 13b of the filter medium 13 and belt 14 between the projections pointed in the directions 16a and out the outlet opening 12.

Figure 5A:
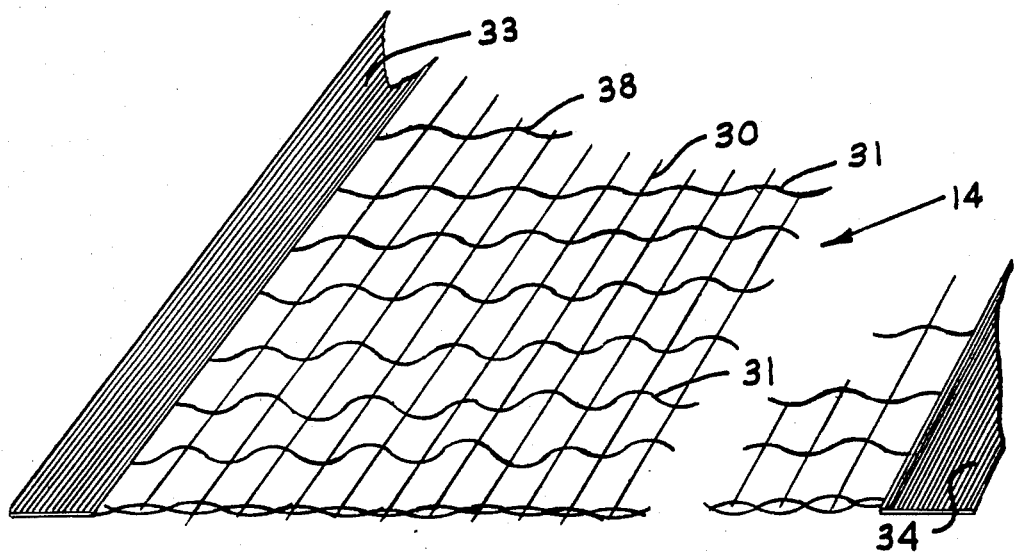
FIG. 5A is a plan partial sectional view of a porous support, such as for a screened belt, where the nexus of strands in one first direction are crimped to restrict movement of the strands oriented in the other direction along the strands in the first direction.
Figure 5B:
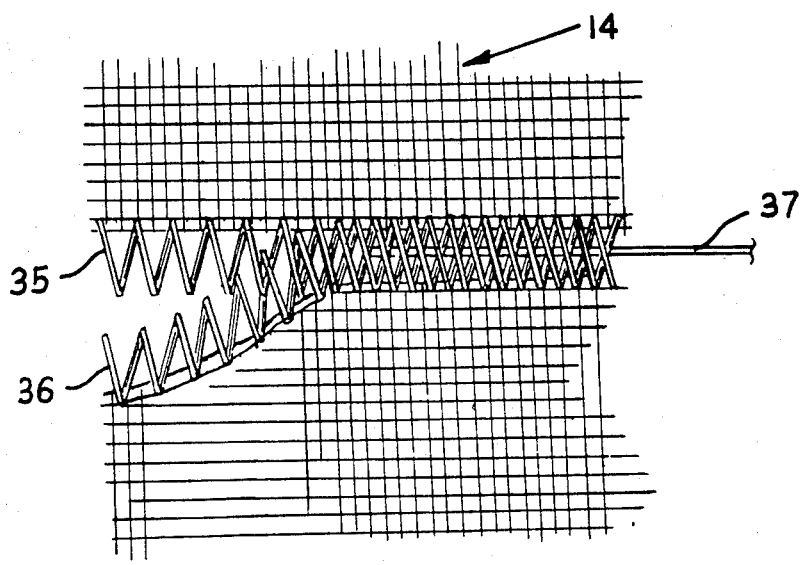
FIG. 5B is a plan view of a section of a screened belt showing a filament for joining ends of the belt to make it continuous.

An important feature of the present invention is the screened feed belt 14. The belt 14 is non-metallic and can be composed of strands interbonded at nexus 24 (or intersections) between the individual strands 25. The polymer is preferably a polyester polymer such that the nexus 24 can be heat bonded or solvent welded. In any event, the bonding of the nexus 24 provides sufficient rigidity to the belt 14 to prevent collapse of the fibers (not shown) of the filter medium 13 in the spaces 26 between the strands 25 which would restrict gas flow. The belt 14 can also be constructed of woven polyester monofilaments including warp strands 30 and weft strands 31 oriented generally perpendicular to each other in two directions at nexus 38, such as shown in FIG. 5A which is preferred. Each weft strand 31 has a permanent crimp in contact with and overlapping the warp strand 30 at the nexus to prevent the warp strands 30 from moving relative to each other. This crimp is permanently retained by heating the weft strands 31 during weaving. This construction has been found to be more reliable than the bonded strands 25 and 24 shown in FIG. 5. In both instances the edges 33 and 34 of the strands are bound with contact cement to prevent unraveling of the strands 30 and 31. The belt 14 is jointed to make it continuous by interlocking polypropylene spiral coils (35) and (36) which in turn are joined together by at least one polypropylene filament 37. The bonding or crimping also allows the belt 14 to b driven and/or aligned by the wire brushes on rollers 18a and 19a.

The polymer strands 25 when coupled with a suitable filter medium 13 when dry provides an electrostatic charge on the filter medium 13 during gas flow which attracts micron and larger sized particles to the filter medium for removal from the gas. Preferably the mesh size is about 6 (36 openings per square inch) or larger and more preferably between about 6 and 12 mesh (36 openings per square inch to 144 openings per square inch or between about 6 openings to 22 openings per square centimeter).

The non-metallic filter medium 13 is of a type which is generally known and can include bonded or unbonded fibers, which can be woven or non-woven. The non-metallic fibers interact with the belt 14 to create the electrostatic charge. The fibers can be cellulosic (paper), glass or polymeric including preferably polyester polymer fibers. The medium preferably has a pressure drop prior to particle loading of between about 0.1 to 2 inches of water ($2.4 \times 10^{-4}$ to $4.9 \times 10^{-3}$ atmospheres). The fibers preferably have a diameter of between about 0.1 and 100 microns and the medium 13 has a preferred density between about 0.2 and 8 pounds per cubic foot ($3.2 \times 10^{-3}$ to $6.28 \times 10^{-1}$ grams per cubic centimeters).

Figure 9:
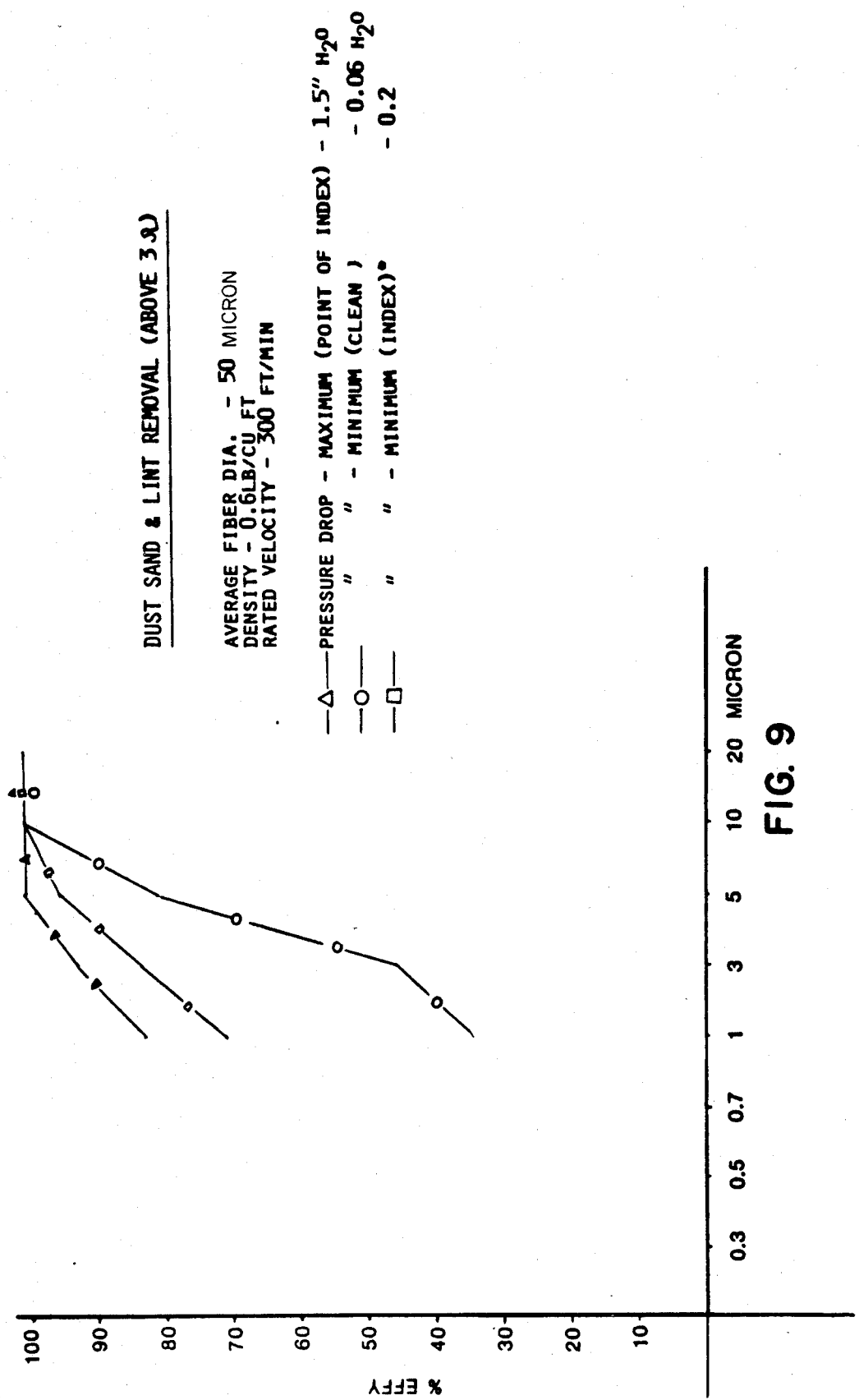

The polymeric screened belt 14 and medium 13 together provide efficient filtration. This can be seen from bench scale tests with a polyester screen of FIG. 5 as the belt 14 with polyester fibers in the medium 13 as shown in FIGS. 7, 8 and 9. Even better results were achieved with the belt 14 shown in FIG. 5A.

Figure 4:
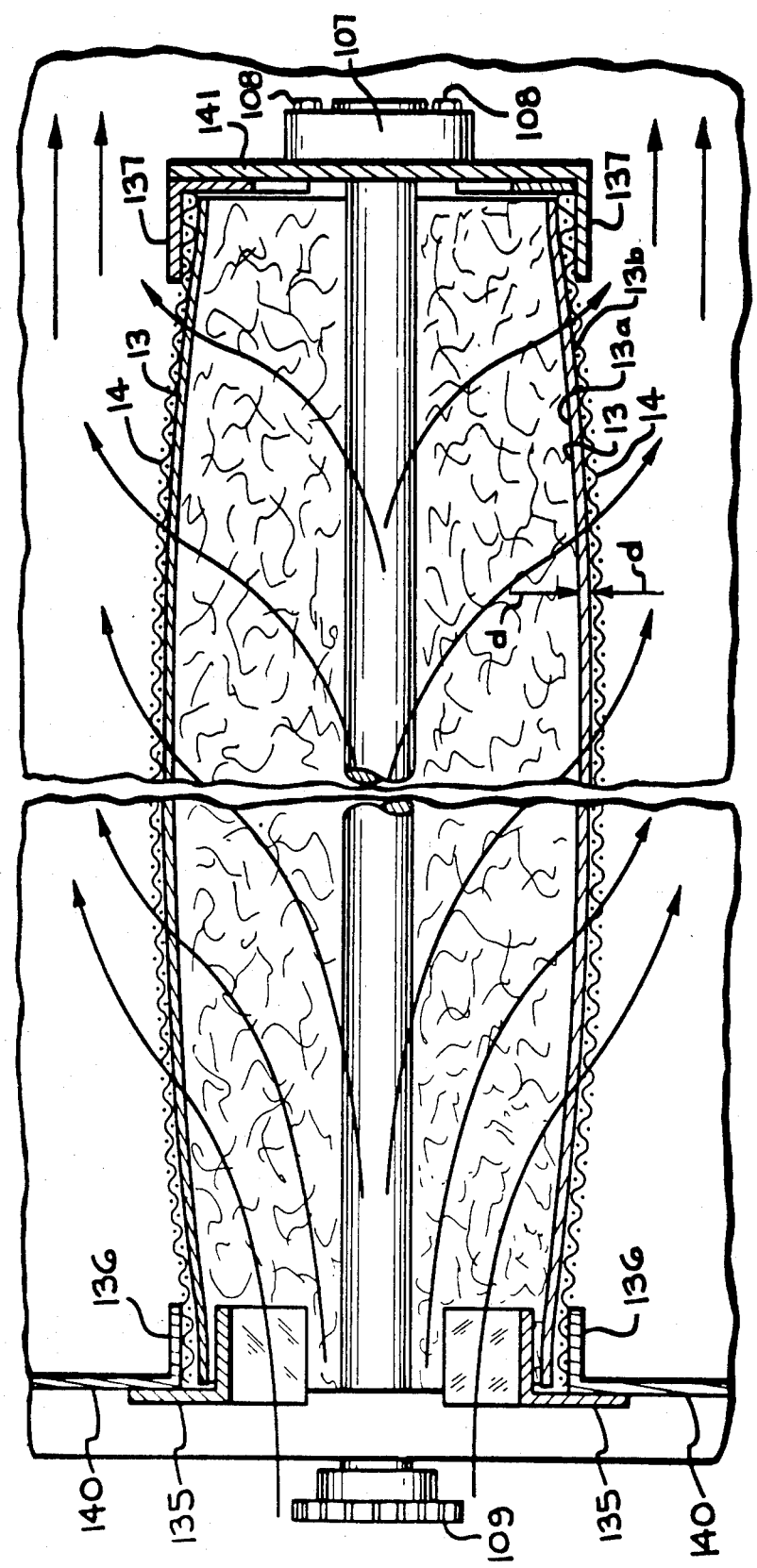
FIG. 4 is a partial cross-sectional view of one sawtoothed projection shown in FIG. 3 along line 4—4 and particularly showing the ballooning of the filter medium and screened belt due to gas pressure.

The details of the construction of the preferred apparatus are particularly shown in FIGS. 2, 3 and 4. The outlet opening 12 includes centrifugal fans 100 and optional adjustable louvers 101 to control the volume and velocity of gas flow. The fans 100 are mounted on a shaft 102 with a pulley wheel 103 which extends outside of the casing 10. A pulley belt 104 around wheel 103 is positioned around a second pulley 105 on a motor 106 mounted on top of the casing 10. The fans 100 preferably pull (rather than push) the air through the filter medium 13.

The rollers 18 are journalled at opposite ends by cap bearings 107 and 107a mounted on the outside of the casing 10 by means of bolts 108. The bearings 107a adjacent the lower portion of the casing 10 are provided with gears 109 for mounting a drive link chain 110. An idler gear 111 for the chain 110 is mounted on the outside of the casing 10. Return rollers 19 and 19a are supported by bearings 112 mounted on the casing 10. One return roller 19a is provided with a first gear 113 which is driven by a second chain 114 connected to a second gear 115 mounted on a reducing drive 116 and motor 117. The chains 110 and 114 are driven by the motor 117 and reducing drive 116 combination and provide a means for moving the belt 14 to remove filter medium 13 from roller 21 for takeup on roll 22. Rollers 18a and 19a have wire brushes 28 and 29 to aid in movement of the belt 14 by preventing slippage. The movement of the belt 14 can be manual but this is not preferred.

When the filter medium 13 is filled with particles, the pressure drop across the depth d between the surfaces 13a and 13b becomes too great for effective filtration because of increased pressure drop. To provide for automatic changing of the filter medium 13, pressure sensing devices 118 and 119 are provided adjacent the opposite sides 13a and 13b of the filter medium 13 to determine the pressure drop and automatically cycle the filter medium 13 sufficiently to provide an acceptable pressure drop. The takeup roll 22 is provided with a pulley wheel 120 and belt 121 driven by a second pulley wheel 122 mounted on a reducing drive 123 and powered by motor 124 mounted on support bar 125. The rolls 21 and 22 are positioned on shafts 126 and 127 on arms 128 and 129 (one side only shown) on the casing 10. Between pulley wheel 122 and reducing drive 123 is a limiting clutch (not shown) which compensates for the increasing diameter of the takeup roll 22 by slipping to prevent tearing of the medium 13. Guide 23 is mounted on arms 131 (only one side is shown) on the casing 10.

As shown in FIG. 3 the belt 14 is tensioned by a pair of sliding bearings 112a using a bolt 132 between spaced parallel plates 133. Using this means, the belt 14 can be trained so that it remains aligned on rollers 18 and 19. Alignment of the bearings 107 and gears 109 is also very important. The belt strands 25 are interbonded at the nexus 24 along the edge 134 (FIG. 5) which prevents unravelling of the belt 14.

FIGS. 3 and 4 show angle irons 135 and 136 which are on or part of extensions 140 (covering projections pointing in direction 16a) (FIG. 6) of casing 10. The irons 135 and 136 form a seal along the edges of the filter medium 13 and belt 14. Opposite and staggered from the extensions 140 are second extensions 141 (covering projections pointing in direction 16) on the casing 10 which are mating in shape to the shape of the extensions 140 as shown in FIG. 6. Thus adjacent the inlet opening 11 the extensions 140 are solid and on the other side at the outlet opening 12 the corresponding space is open as shown in FIG. 4. Angled members 137 support the belt 14 to prevent leakage between the inlet opening 11 and outlet opening 12.

As shown in FIG. 4 the belt 14 and filter medium 13 are ballooned in the direction of air flow shown by the arrows. FIG. 4 is slightly exaggerated; however, it does show that both the medium 13 and belt 14 stretch under the gas pressure. The stretching allows the gas flow across the surface to flutter the media 13 against the belt 14 together to create an electrostatic charge which attracts the smallest sized particles. Thus the configuration of FIG. 4 is preferred.

OPERATION

In operation, the belt 14 and filter medium 13 are trained on the rollers 18 and 19 as shown in FIG. 2 by means of bearings 107 and 112. Motor 106 is started to rotate the fans 100. Louvers 101 are adjusted to the proper gas flow. The particle (liquid or solid) laden gas enters the inlet opening 11, passes across a first surface 13a between the projections pointed in the directions 16a and through the filter 13 causing the filter 13 and belt 14 to balloon and to flutter in contact with each other causing an electrostatic charge which attracts the particles and removes them from the gas and then the cleansed gas passes through the second surface 13b, through the belt 14, across the belt 24 and out the outlet opening 12 between the extensions 141 as shown in FIG. 6. The casing 10 includes conduit extension 10a for the fans 100 and conduit extension 10b for focussing the air away from the outlet opening 12. Upon maximum loading of particles in the filter medium 13, the sensor devices 118 and 119 detect the increased pressure drop across the medium 13 and signal motors 117 and 124 to operate. The medium 13 is then conveyed from the dispensing roller 21 with the belt 14 to the takeup roller 22 until the change in pressure is reduced to an acceptable level. In most instances this will leave some particle loaded medium 13 in the filter path. The cycle is repeated periodically as particle loading progresses.

The apparatus is usually mounted adjacent a ceiling in a shop or factory so that clean air is circulated throughout the shop. The unit is designed to recycle heated or cooled air and thus produces considerable energy savings. The apparatus can handle as low as 2000 cfm and up to 200,000 cfm (942 to 94,200 liters per second) of gas with ease and will remove welding smoke or oil mist in air in the fraction of a micron size or smaller (0.1 micron) and particles up to or above 100 microns. The pressure drop across the medium 13 is generally between 1 and 2 inches of water ($2.4 \times 10^{-3}$ to $4.9 \times 10^{-3}$ atmospheres) at about 50 to 500 feet per minute (25 to 250 centimeters per second) when the filter medium 13 is clean. The apparatus thus provides energy efficiency and pollution reduction.

I claim:
1. In a method of filtering gas borne particles in a filtering apparatus wherein inlet and outlet openings (11 and 12) in the apparatus are separated by a filter medium (13) mounted on a porous support (14) for filtration, the improvement which comprises:
    (a) providing a small mesh screen as the porous support (14) composed of polymeric strands, the screen having a mesh size of about 6 or greater, in contact with the filter medium (13) which is nonmetallic and has a density of about $3.2 \times 10^{-3}$ to $6.28 \times 10^{-1}$ grams per cubic centimeter wherein upon interaction of the screen in contact with the filter medium during gas flow across an exposed surface of the filter medium opposite the contact with the screen by a fluttering movement of the filter medium on the screen an electrostatic charge is created which attracts 0.1 micron and larger sized particles to the filter medium for removal from the gas; and
    (b) flowing a gas along the surface of the filter medium, through the filter medium and then the screen at a gas velocity of between about 25 and 1000 feet per minute at a pressure drop across the filter medium of less than about 2 inches of water, wherein an increasing percentage of the particles of a particular size are removed as a result of particle loading of the filter medium during filtration.

2. The method of claim 1 wherein the filter medium is composed of polymeric fibers having a diameter of between about 0.1 and 100 microns.

3. The method of claim 1 wherein the filter medium is composed of polyester polymer fibers and the filter material has a density of between about 0.2 and 8 pounds per cubic foot.

4. The method of claim 1 wherein the pressure drop is between about 1 and 2 inches of water and wherein the gas velocity is between about 50 and 500 feet per minute.

5. The method of claim 1 wherein the gas is air containing welding smoke which is removed during the filtration.

6. The method of claim 1 wherein the mesh size of the screen is between about 6 and 12 mesh.

7. The method of claim 6 wherein the screen is composed of polyester polymer strands.

8. The method of claim 1 wherein the strands of the porous support are woven (25, 30, 31) to provide nexus of overlapping strands oriented generally perpendicular to each other in two directions.

9. The method of claim 8 wherein the nexus of the strands (31) in at least one first direction are crimped to restrict movement of the strands (30) oriented in the other direction along the strands in the first direction.

10. The method of claim 9 wherein the porous support is in the form of a moveable belt (14) with the crimped strands along the length of the belt.

11. The method of claim 8 wherein the nexus (24) are interbonded.

12. The method of claim 1 wherein the gas flow is parallel to the exposed surface of the filter medium, then through the filter medium and through the screen and then along an exposed surface of the screen.

* * * * *